United States Patent [19]
Ozaki et al.

[11] Patent Number: 6,070,904
[45] Date of Patent: Jun. 6, 2000

[54] AIR BAG DEVICE WITH BREAKABLE RETAINER STRAP

[75] Inventors: Toru Ozaki; Takeshi Yamaji; Kazuaki Bito; Hidehito Sogi, all of Osaka; Takeshi Oyama, Aichi; Kenji Kaneko, Aichi; Yoshio Yamada, Aichi, all of Japan

[73] Assignee: Toyo Tire & Rubber Co., Ltd., Osaka, Japan

[21] Appl. No.: 08/817,493

[22] PCT Filed: Aug. 20, 1996

[86] PCT No.: PCT/JP96/02330

§ 371 Date: Jul. 2, 1997

§ 102(e) Date: Jul. 2, 1997

[87] PCT Pub. No.: WO97/06984

PCT Pub. Date: Feb. 27, 1997

[30] Foreign Application Priority Data

Aug. 21, 1995 [JP] Japan ................................ 7-236017

[51] Int. Cl.[7] .................................................. B60R 21/16
[52] U.S. Cl. ........................... 280/743.1; 280/728.1; 280/728.2; 280/743.1
[58] Field of Search ........................ 280/728.1, 728.2, 280/730.2, 733, 743.1, 743.2

[56] References Cited

U.S. PATENT DOCUMENTS

| | | | |
|---|---|---|---|
| 5,004,266 | 4/1991 | Miller et al. | 280/743 |
| 5,062,664 | 11/1991 | Bishop et al. | 280/743 |
| 5,378,011 | 1/1995 | Rogerson et al. | 280/728.2 |
| 5,562,301 | 10/1996 | Lutz | 280/728.2 |
| 5,588,667 | 12/1996 | Emambakhsh et al. | 280/728.2 |

FOREIGN PATENT DOCUMENTS

| | | |
|---|---|---|
| 54-3486 | 2/1979 | Japan . |
| 4-62253 | 5/1992 | Japan . |

*Primary Examiner*—Eric Culbreth
*Assistant Examiner*—L. Lum
*Attorney, Agent, or Firm*—Jordan and Hamburg LLP

[57] ABSTRACT

An air bag device has an air bag at least partially receivable in a predetermined receiving part of a vehicle along with an inflator for inflating the air bag. A band is breakable by a deployment pressure of the air bag and is provided such that at least a part of the air bag is strapped by the band to retain a folded shape prior to deployment of the air bag. The band is formed of a woven fabric in an embodiment and includes a breaking part formed by breaking assisting structure arranged in a line corresponding to a breaking direction of the breaking part. In an embodiment of the air bag device the woven fabric has weaving thread inclined at an inclination angle with respect to the breaking direction of the breaking part. A further feature provides a retainer including an attachment part for fixing the air bag to the inflator and the band including an insertion hole part formed therein through which the attachment part of the retainer and the inflator are inserted such that the air bag is strapped together with the retainer by the band.

9 Claims, 6 Drawing Sheets

6,070,904

AIR BAG DEVICE WITH BREAKABLE RETAINER STRAP

TECHNOLOGICAL FIELD

This invention relates to an air bag device for a vehicle.

BACKGROUND ART

An air bag device is a device for inflating an air bag and restraining an occupant in the case of a collision of a vehicle, and for example one for a driver's seat generally has an inflator, which is a gas generator, an air bag capable of inflating by gas of the inflator, and a receiving part made of a soft resin.

A part or all of the folded air bag is received into the above-mentioned receiving part, and at this time the air bag is folded into a predetermined shape, reforming is carried out to prevent shape-collapsing and then it is put into the receiving part and thereby assembled.

However, the package volume of the air bag differs between immediately after folding and after reforming, particularly, because the cloth of the air bag has no fold habit immediately after folding, the folded air bag rises by the tendency to return from its folded state to its original shape, and when an attempt is made to receive it into fixed dimensions a reaction force arises, consequently there has been the problem that the receiving and assembly work is difficult to carry out.

With respect to this, in JP-A-07132789, strapping the air bag with a band made of a film so as to hold its folded state and breaking this band by means of the deployment pressure of the air bag is disclosed. However, when the band is to be broken by means of the deployment pressure like this it is not easy to perform that breaking smoothly.

It is therefore a first object of the invention to, in an air bag device whose receiving and assembling workability have been improved by holding the folded shape of an air bag by means of a band, make smooth breaking of the band possible.

Also, with an air bag device disclosed in the above-mentioned publication, there are problems of manufacturability such as that it is necessary to wind the band avoiding a bolt part of a retainer for fixing the air bag to the inflator and it is necessary to split open the band when inserting the inflator.

It is therefore a second object of the invention to, in an air bag device whose receiving and assembly workability have been improved by holding the folded shape of an air bag by means of a band, achieve further improvement of assembly workability.

On the other hand, conventionally in air bag devices, suppressing jump-out of the air bag during the initial stage of its deployment and controlling its deployment behavior has been carried out. For example, in JP-A-06206508, disposing a flow regulator inside the air bag for changing the direction of gas flow blasting from the inflator to a direction orthogonal to the jump-out direction toward the occupant and thereby reducing jump-out speed to the occupant direction during the initial stage of the deployment and obtaining good deployment behavior is disclosed. However, when a flow regulator is provided, there has been the problem that the labor of when adjusting the shape and arrangement construction of the flow regulator according to the air bag specifications and inflator output characteristics is great.

With respect to this, the present inventors have discovered that, in an air bag device wherein the folded shape of the air bag is held by the above-mentioned band, by adjusting the breaking strength and so on of this band, it is possible to easily make good the deployment behavior of the air bag.

That is, a third object of the invention is to, in an air bag device whose receiving and assembly workability have been improved by holding the folded shape of an air bag by means of a band, obtain good air bag deployment behavior.

DISCLOSURE OF THE INVENTION

An air bag device according to this invention has as a basic construction having an air bag and an inflator for inflating this air bag wherein by means of a band broken by deployment pressure of the air bag a part of the air bag is strapped so as to hold its folded shape and this air bag is received into a predetermined receiving part. By this means, because there ceases to be folding-collapsing and loosening of the air bag caused by assembly work, the dimensions of the package volume of the air bag can be stabilized and it is possible to facilitate handling of the air bag after folding and make the receiving work thereof easy. Also, a reforming operation after folding of the air bag becomes unnecessary.

An air bag device according to a first invention is characterized in that, in the basic construction described above, the band consists of a woven fabric, a breaking part thereof is formed by breaking assisting means provided in a line and the angle of the weaving thread of the woven fabric is inclined with respect to the breaking direction of the breaking part. By thus in a band made of a woven fabric for strapping an air bag forming a breaking part thereof by means of breaking assisting means provided in a line and biasing the weaving thread direction of the woven fabric with respect to breaking direction of the breaking part extending along these breaking assisting means, the above-mentioned first object, i.e. smooth breaking of the band on deployment of the air bag, is achieved.

In an air bag device of this first invention, the inclination angle of the weaving thread with respect to the breaking direction of the breaking part being 400 to 500 is desirable from the point that it makes possible smoother breaking.

Also, in a air bag device of this first invention, all weaving threads passing through spaces of the breaking assisting means being cut by the breaking assisting means is desirable from the point that it makes possible smoother breaking.

An air bag device according to a second invention is characterized in that, in the basic construction described above, an insertion hole part through which an attachment part of a retainer fixing the air bag to the inflator and the inflator are inserted is formed in the band, the air bag is strapped with the band together with the retainer and the band is fixed by means of attachment of the air bag to the inflator by this retainer. In this construction, when the air bag is attached to the inflator with the retainer, the attachment part of the retainer and the inflator are inserted through the insertion hole part of the band and the band is fixed with this retainer.

An air bag device according to a third invention is characterized in that, in the basic construction described above, by means of engagement between an engagement hole provided in the band and an engagement claw provided on a base plate for holding the lower face of the air bag the band is fixed to the base plate. By hitching the engagement hole of the band on the engagement claw of the base plate in this way, it is possible to fix the band strapping the air bag easily.

With these second and third inventions, by achieving systemization utilizing other necessary components such as the retainer and the base plate for the attachment of the band, the above-mentioned second object, i.e. further improvement of the assembly workability, can be achieved.

It is also possible to add the construction of the second invention to an air bag device of the third invention. That is, in an air bag device of the third invention, it may be made an air bag device wherein an insertion hole part through which an attachment part of the retainer and the inflator are inserted is provided in one end of the band and an engagement hole which engages with an engagement claw of the base plate is formed in the other end, the air bag is strapped with the band together with the retainer, and the one end of the band is fixed by means of the attachment of the air bag to the inflator by the retainer and the other end is fixed by engagement with the engagement claw of the base plate.

An air bag device according to a fourth invention is. characterized in that, in the basic construction described above, the band is disposed so as to press down a pair of side parts including a central portion of the folded air bag, and on deployment of the air bag, after a cover covering the upper face of the air bag is split open by deployment pressure, the band breaks. By making the band break after splitting-open of the cover in this way, on air bag deployment, because deployment starts from non-held parts which are not held by the band and deployment of the central part held by the band is delayed, the initial stage jump-out speed in the occupant direction is low and deployment in a direction perpendicular to the jump-out direction is promoted. In other words, good deployment behavior, which is the third object mentioned above, is obtained.

In this fourth invention, the band being made of a woven fabric, a breaking part thereof being formed by breaking assisting means provided in a line, and the angle of the weaving thread of the woven fabric being inclined with respect to the breaking direction of the breaking part is preferable from the point of making the band break smoothly.

In air bag devices of the second through fourth inventions described above, the band can be formed using a woven fabric, a nonwoven fabric or a film. Also, the breaking part of the band can be formed by breaking assisting means consisting of one type or two or more types of any of holes, slits, cutaways or stitching.

PREFERRED EMBODIMENTS OF THE INVENTION

Figure 1:
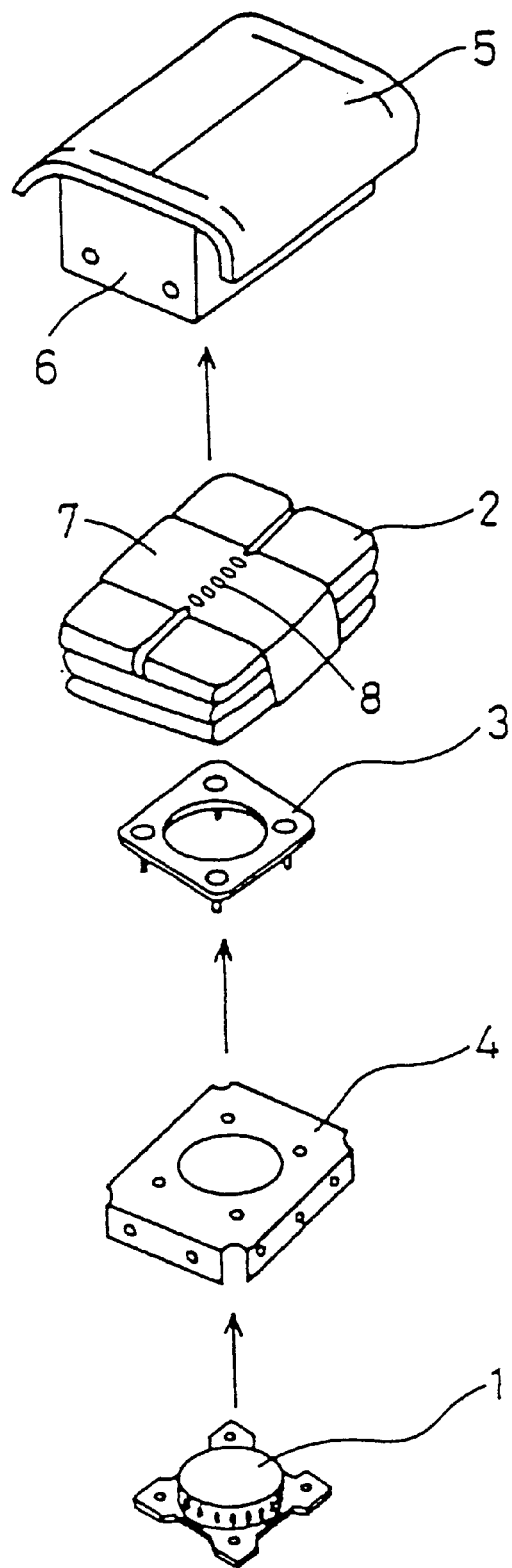
FIG. 1 is an exploded perspective view of an air bag device according to an embodiment of the first invention of the invention.

FIG. 1 shows an exploded perspective view of an air bag device according to an embodiment of the first invention of the invention.

This air bag device has a construction wherein an inflator 1, which is a gas generator, and an air bag 2 capable of inflating by this inflator 1 are fixed to a base plate 4 by means of a retainer 3 and a part or all of the air bag 2 folded as shown in the figure is received into a receiving part 6 on a top part of which is mounted a cover 5.

By means of a band 7 broken by a predetermined deployment pressure of the air bag 2, a part of the folded air bag 2, in the figure a pair of side parts including a central portion, is wound so that the air bag 2 holds its folded shape of the receiving time and the air bag 2 is received into the receiving part 6.

Figure 2:
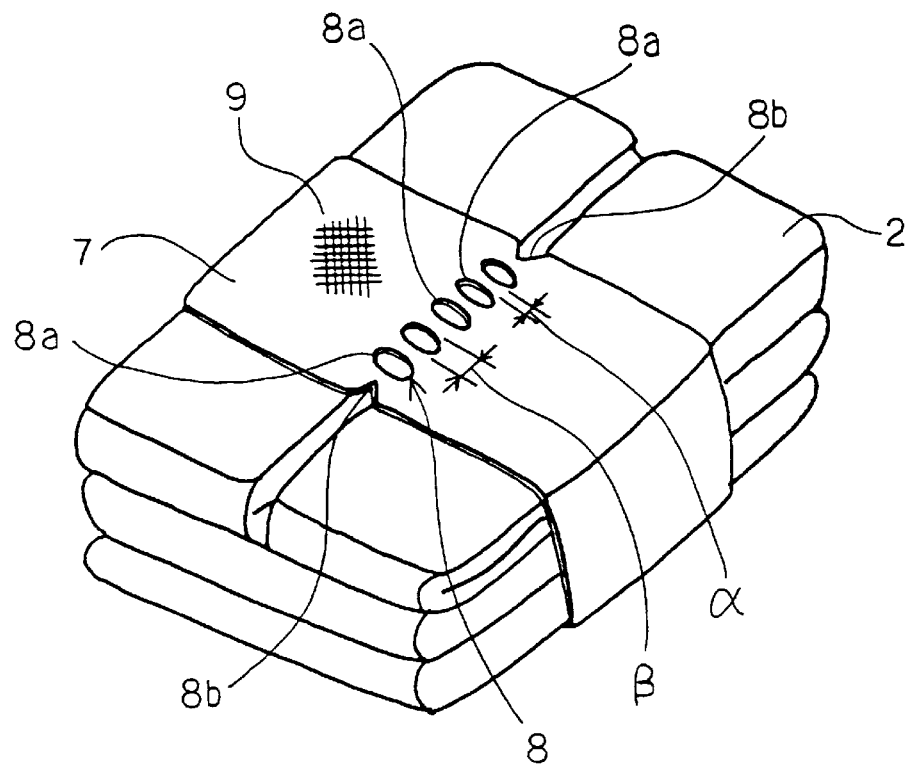
FIG. 2 is a perspective view of an air bag in this air bag device.

As shown in FIG. 2, the band 7 is formed using a band-shaped woven fabric, and so that it breaks at an upper face central part thereof on deployment of the air bag 2, in this central part a plurality of breaking assisting holes 8a are provided disposed in a line from one side edge of the band 7 toward the other side edge, i.e. in the width direction of the band 7. Also, at both ends of the breaking assisting holes 8a lined up in this line form, in the edges of the band 7, notches 8b for break assistance are provided. A breaking part 8 of the band 7 is formed by the breaking assisting holes 8a and the notches 8b.

Figure 3:
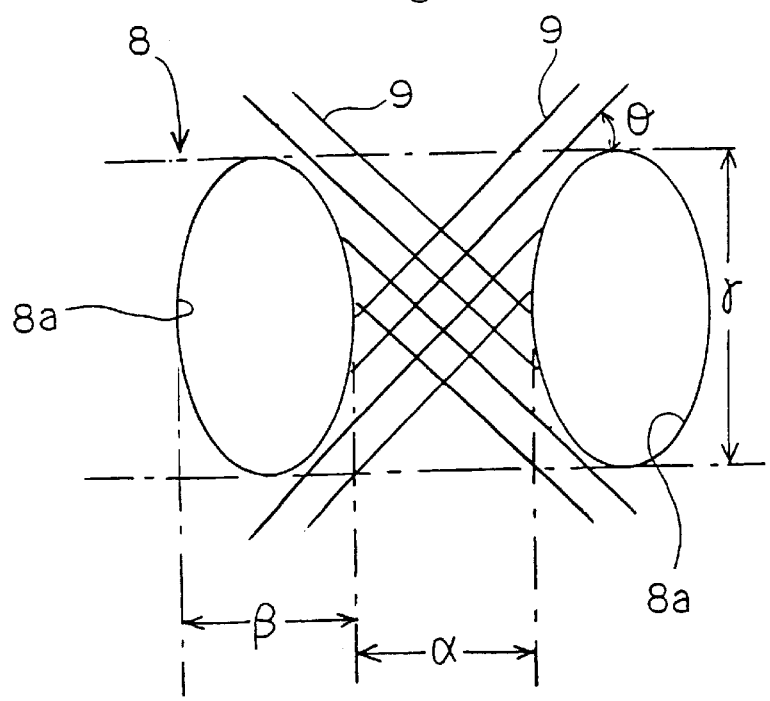
FIG. 3 is an enlarged plan view of a band for strapping this air bag.

It is disposed so that the angle of the weaving thread 9 of the band 7 is not perpendicular and is inclined with respect to the breaking direction of the breaking part 8. Preferably, as shown in FIG. 3, the inclination angle θ of the weaving thread 9 with respect to the above-mentioned breaking direction is about 40° to 50°. Also, the inter-hole spacing α of the breaking assisting holes 8a selectively being formed in the range of about 3 to 5 mm, the length β of the breaking assisting holes 8a in the breaking direction in the range of about 2 to 30 mm, and the length γ in a direction orthogonal to the breaking direction of the breaking assisting holes 8a in the range of about 0.5 to 40 mm respectively is preferable.

Preferably, as shown in FIG. 3, in the breaking part 8, all the weaving threads 9 passing through the spaces between the breaking assisting holes 8a are cut by the breaking assisting holes 8a. In other words, the above-mentioned inclination angle θ, the inter-hole spacing α and the length γ of the breaking assisting holes 8a are preferably set so that it becomes a structure wherein weaving threads 9 existing in the space between a breaking assisting hole 8a and a breaking assisting hole 8a adjacent to this are all cut by the breaking assisting holes 8a. When it is made a construction such that weaving threads 9 are not connected at the breaking part 8 like this, instead of the breaking assisting holes 8a the breaking part 8 may be constituted with slits extending in the length direction of the band 7.

In an air bag device of the embodiment described above, as a result of the folded shape of the air bag 2 being held by the band 7, it is possible to eliminate folding-collapsing and loosening of the air bag 2 caused by assembly work, the dimensions of the package volume of the air bag 2 are stabilized and it is possible to facilitate handling of the air bag 2 after folding and make receiving work thereof simple.

As a result of making the direction of the weaving threads 9 of this band 7 biased with respect to the breaking direction of the breaking part 8, breaking of the band 7 on deployment of the air bag 2 becomes smooth. In particular, by making the inclination angle θ of the weaving threads 9 about 40° to 50° and constructing so that the weaving threads 9 are not connected at the breaking part 8, as described above, because the breaking strength of the spaces between these breaking assisting holes 8a is determined by the fraying strength of the weaving threads 9 cut when the breaking assisting holes 8a are made, there is little dispersion of the breaking strength of the band 7 and also the breaking strength is small. Consequently, breaking of the band 7 on deployment of the air bag is stabilized and smoother breaking becomes possible.

As the above-mentioned band 7, using a non-coated woven fabric or a coated woven fabric cut by melting to prevent fraying is suitable, and as the material thereof nylon 66, polyester, nylon 6, nylon 46 and the like can be given as suitable examples. It is also possible to use this band 7 forming it integrally with the air bag 2. Furthermore, it is also possible to strap the above-mentioned folded air bag 2 together with the base plate 4 and the inflator 1.

Figure 4:
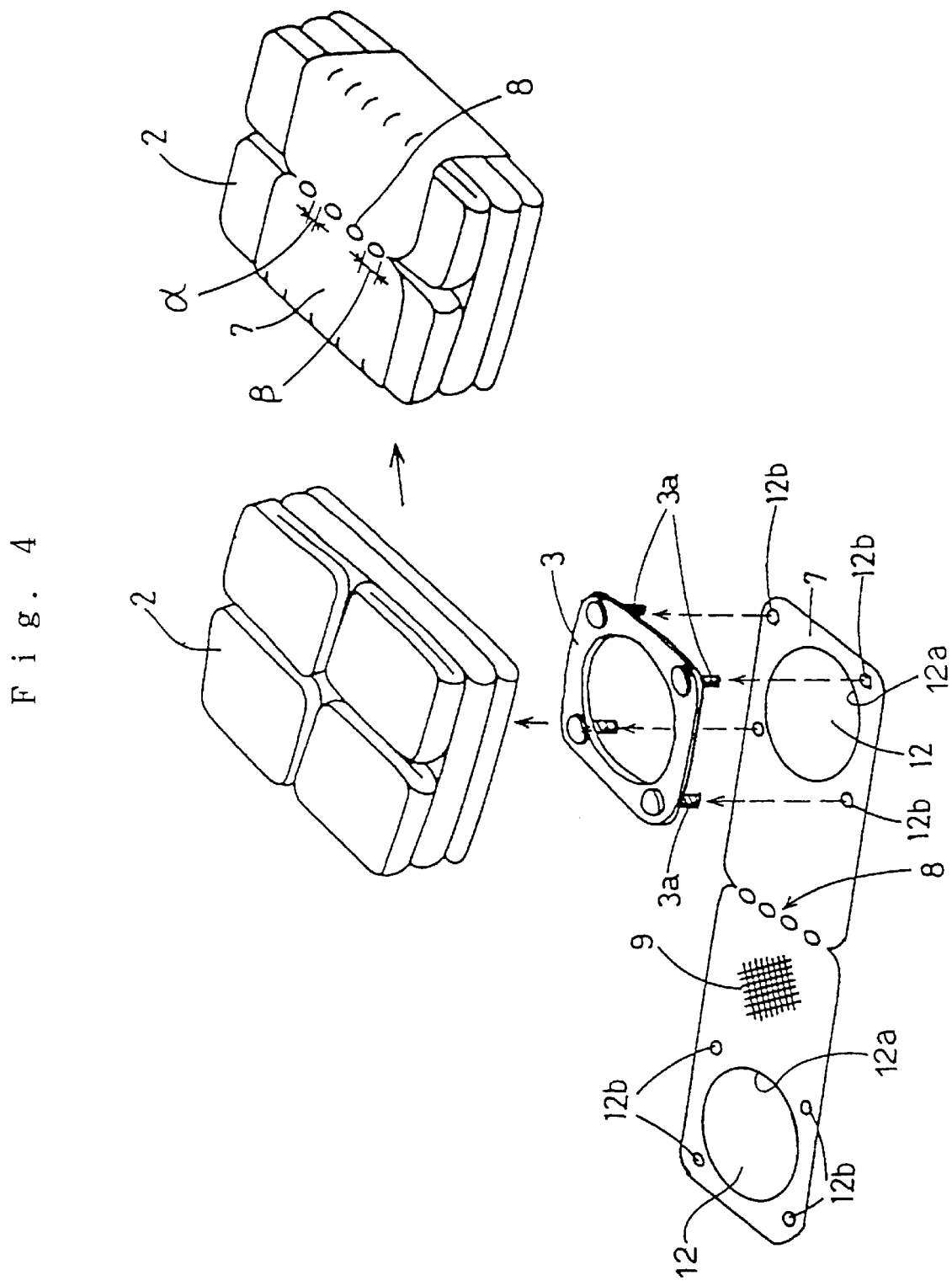
FIG. 4 is a perspective view showing an example of strapping of an air bag with a band in an air bag device according to an embodiment of the second invention of the invention.

FIG. 4 shows an example of strapping of an air bag 2 with a band 7 in an air bag device according to an embodiment of the second invention. Points of difference from the embodiment of the first invention described above will now be described.

In an air bag device of this embodiment, insertion hole parts 12 through which bolts 3a of a retainer 3 for fixing the air bag 2 to the inflator 1 and the inflator 1 are inserted are pre-formed in both sides of the band 7, the folded air bag 2 is strapped with the band 7 together with the retainer 3 and the band 7 is fixed by means of attachment of the air bag 2 to the inflator 1 by the retainer 3.

In detail, the bolts 3a of the retainer 3 disposed in a for-inflator opening (not shown) of the air bag 2 are passed through the insertion hole part 12 at one end of the band 7 and that end is thereby fixed, and the air bag 2 is then strapped with the band 7. Then, the bolts 3a of the retainer 3 are passed through the insertion hole part 12 at the other end of this wound band 7, and after that it is fastened to the inflator 1 by way of the base plate 4 by the bolts 3a of the retainer 3 and the band 7 is thereby attached and fixed to the base plate 4 together with the air bag 2.

Here, the insertion hole parts 12 of the b and 7 are made up of an opening 12a through which the inflator 1 is passed and a plurality of small holes 12b around that through which the bolts 3a of the retainer 3 are passed.

In an air bag device of this embodiment, because the insertion hole parts 12 through which the bolts 3a of the retainer 3 and the inflator 1 are passed are provided in advance in the band 7, during the assembly operation, it is not necessary to avoid the bolts 3a of the retainer 3 when strapping the air bag 2 with the band 7 or split open the band 7 when inserting the inflator 1, and furthermore since this attachment of the band 7 is carried out utilizing the retainer 3 there is no accompanying of an increase in the number of members. Therefore, the assembly operation can be carried out more swiftly.

Figure 5:
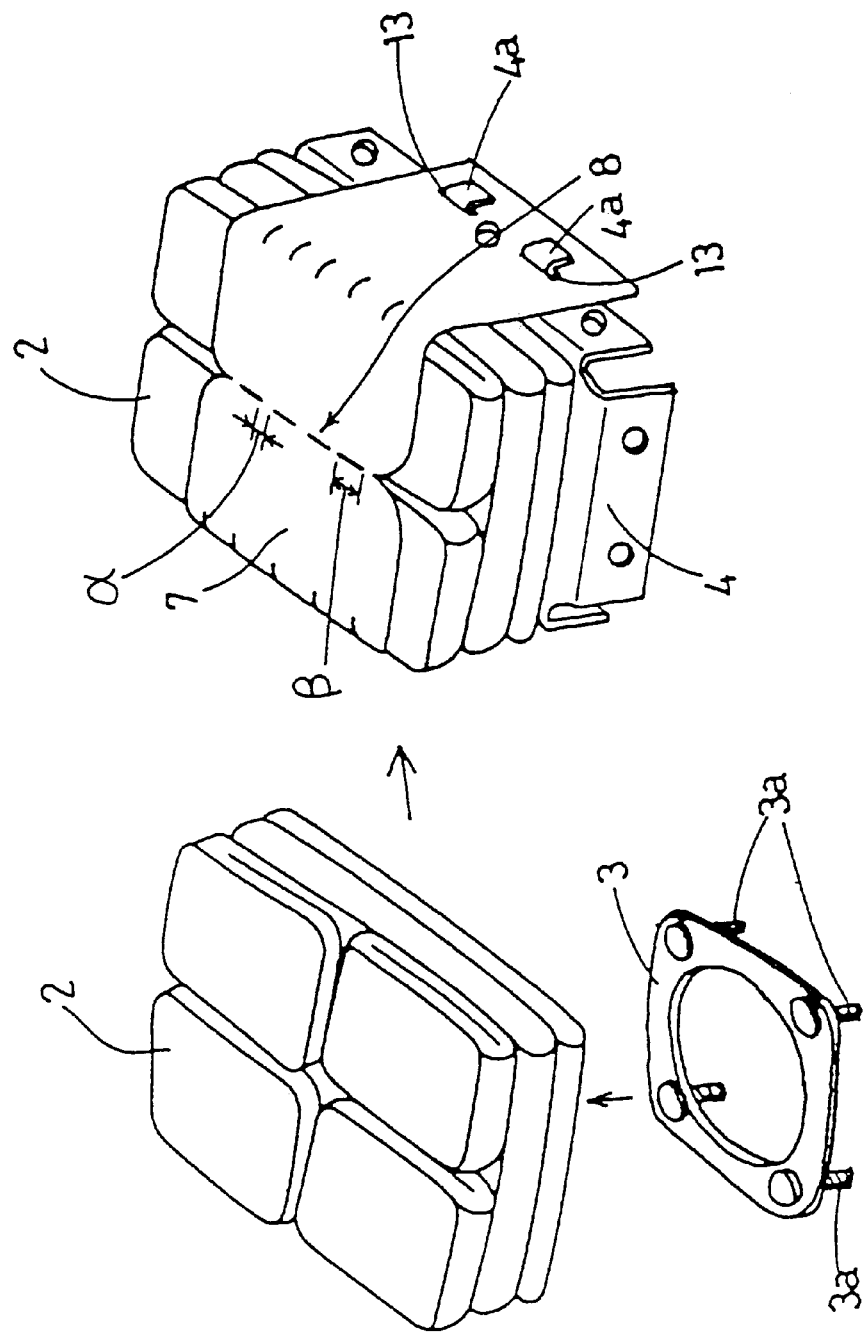
FIG. 5 is a perspective view showing an example of strapping of an air bag with a band in an air bag device according to an embodiment of the third invention of the invention.

FIG. 5 shows an example of strapping of an air bag 2 with a band 7 in an air bag device according to an embodiment of the third invention. Points of difference from the embodiment of the first invention described above will now be described.

In an air bag device of this embodiment, by engagement between engagement holes 13 provided in the band 7 and engagement claws 4a provided on the base plate 4 holding the lower face of the air bag 2, the band 7 is fixed to the base plate 4.

One or more of the engagement holes 13 are provided in each end of the band 7, and one or more of the engagement claws 4a are provided in each of two opposite sides of the base plate 4. Here, the width and length of the engagement claws 4a are each made about 5 to 30 mm, and the engagement holes 13 hitched on the these engagement claws 4a are □-shaped or slit-shaped.

The folded air bag 2 is disposed on the base plate 4 together with the retainer 3, the engagement claws 4a of one side are passed through the engagement holes 13 of one end of the band 7 to fix that one end and then the upper face of the air bag 2 is covered with the band 7 and the engagement claws 4a of the other side are passed through the engagement holes 13 of the other end and the other end is thereby fixed. As a result, utilizing the base plate 4 the air bag 2 becomes strapped by the band 7.

Figure 6:
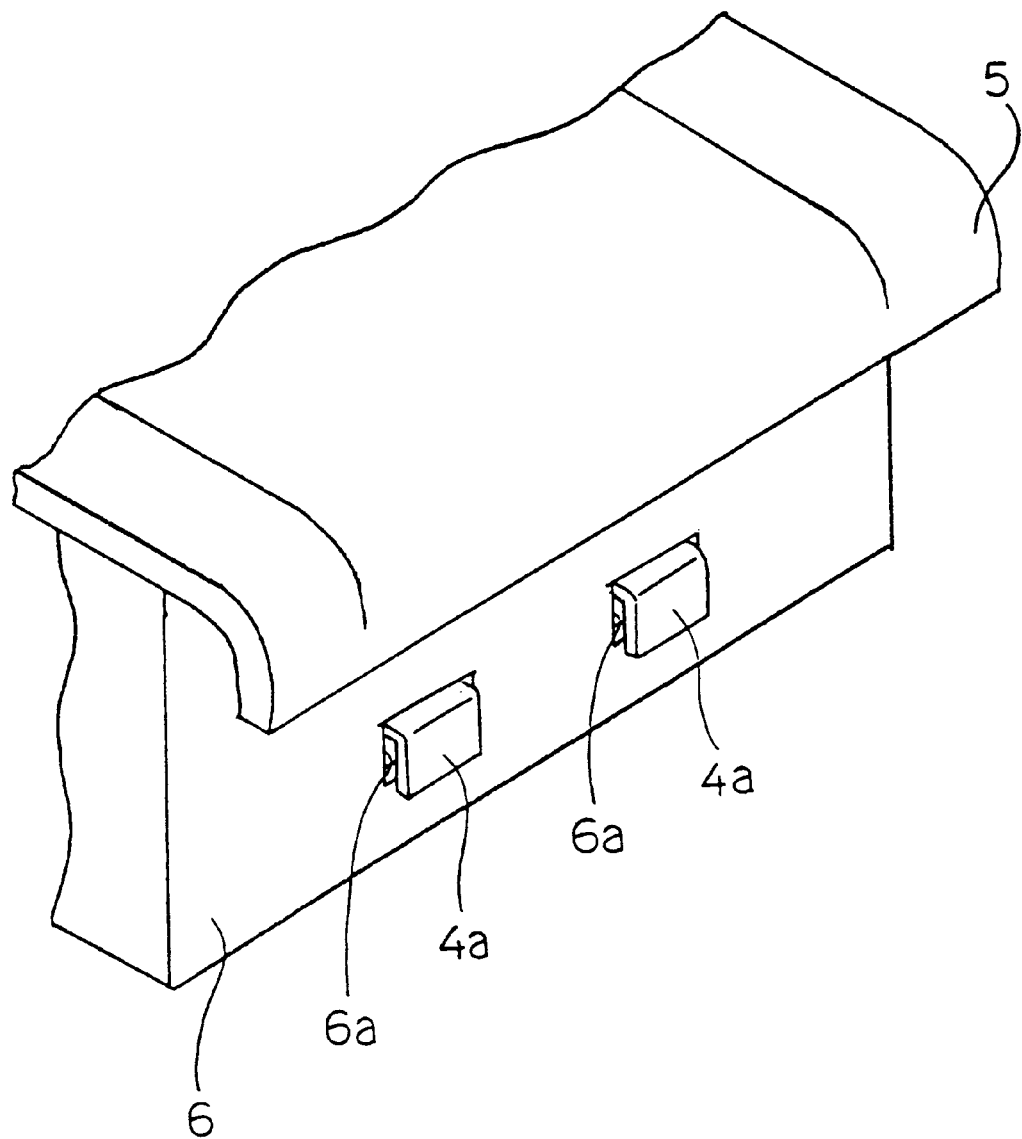
FIG. 6 is a part enlarged perspective view of the air bag device of the preceding figure.

Then, as shown in FIG. 6, by the engagement claws 4a of the base plate 4 being passed through engagement holes 6a provided in side walls of the receiving part 6, the base plate 4 is securely fixed in the receiving part 6 and certain attachment fixing of the band 7 is effected.

With an air bag device of this embodiment, because strapping of the air bag 2 with the band 7 is carried out by fixing the band 7 at both sides of the base plate 4, during the assembly operation, it is not necessary to avoid the bolts 3a of the retainer 3 when strapping the air bag 2 with the band 7 or split open the band 7 when inserting the inflator 1. Also, because the above-mentioned fixing is carried out by engagement of the engagement holes 13 of the band 7 with the engagement claws 4a of the base plate 4, assembly is easy. Furthermore, because this attachment of the band 7 is carried out utilizing the base plate 4, there is no accompanying of an increase in the number of members. Therefore, the assembly operation can be carried out more swiftly.

In this embodiment, in addition to the engagement of the engagement claws 4a of the base plate 4 with the engagement holes 6a of the receiving part 6, the base plate 4 and the side walls of the receiving part 6 may be fixed together with bolts or rivets. Also, it may be made a construction wherein the base plate 4 and the receiving part 6 are fixed together with the above-mentioned bolts or rivets only, without the engagement holes 6a being provided in the receiving part 6.

Also, in this embodiment, the construction of the second invention described above may be added. That is, it may be made a construction wherein an insertion hole part 12 through which the bolts 3a of the retainer 3 and the inflator are passed is provided at one end of the band 7, engagement holes 13 through which engagement claws 4a of the base plate 4 are passed are provided in the other end, and after the above-mentioned one end is fixed by means of the retainer 3 the folded air bag 2 is strapped and the above-mentioned other end is fixed to the base plate 4.

Figure 7:
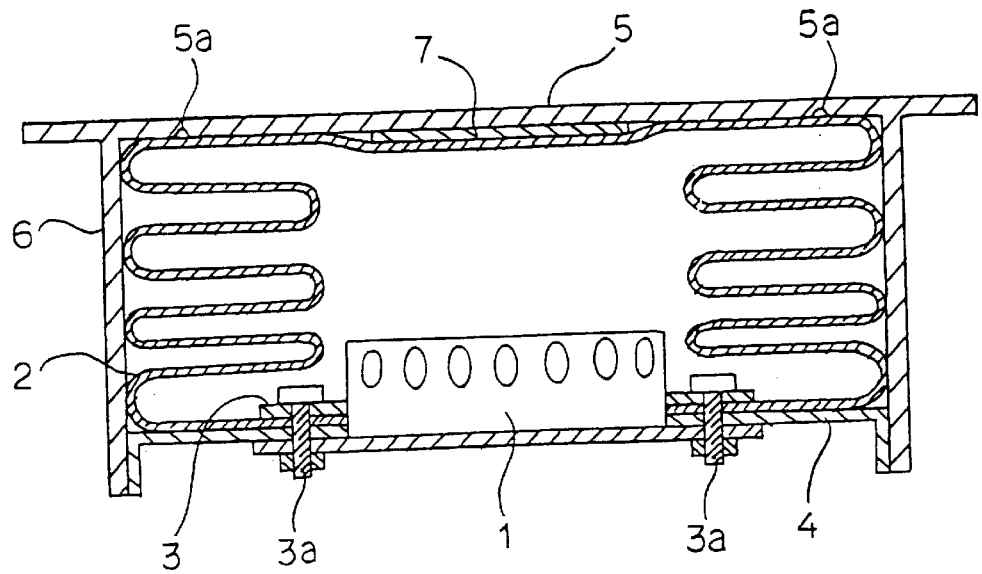
FIG. 7 is a vertical sectional view of an air bag device according to an embodiment of the fourth invention of the invention.

FIG. 7 shows a vertical sectional view of an air bag device according to an embodiment of the fourth invention. Points of difference from the embodiment of the first invention described above will now be described.

In this embodiment, it is constructed so that the band 7 is so disposed that it presses down a pair of side parts including a central portion of the folded air bag 2, and on deployment of the air bag 2, after a cover 5 covering the upper face of the air bag 2 is split open by deployment pressure, the band 7 breaks.

Figure 8:
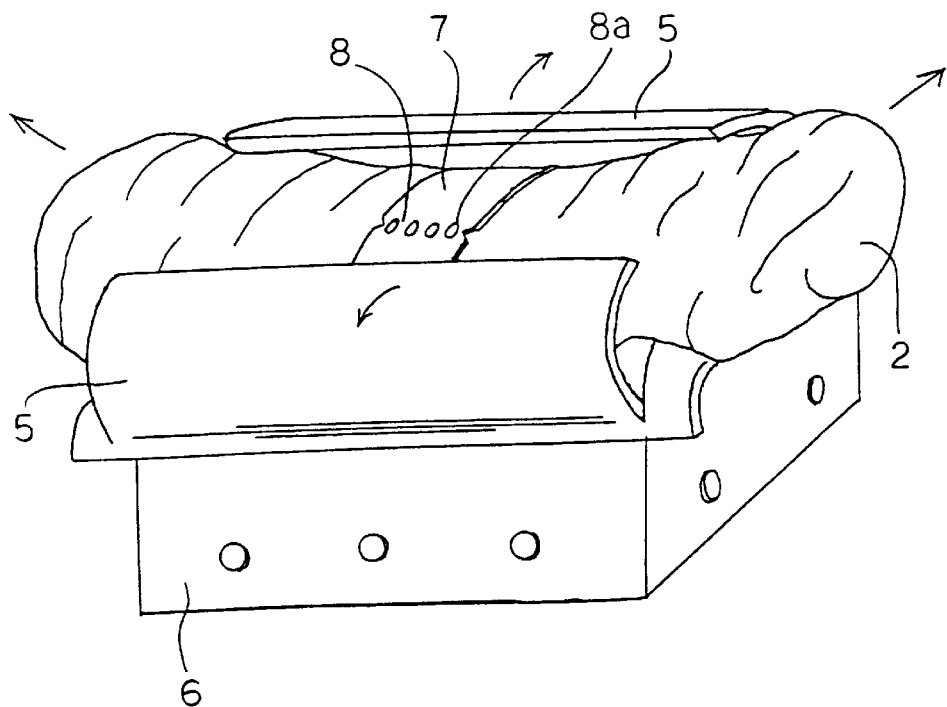
FIG. 8 is a perspective view showing a state in the initial stage of deployment of the air bag device of the preceding figure.

That is, when gas is supplied into the air bag 2 from the inflator 1, first, deployment starts from both sides of the air bag 2 not held by the band 7. As a result of the deployment pressure of these two sides, grooves 5a formed in the underside of the cover 5 break and the cover 5 splits open as shown in FIG. 8. After that, the band 7 which had been pressing down the central part of the upper face of the air bag 2 breaks at the breaking part 8 formed by the breaking assisting holes 8a in a line in that central part of the upper face and the central part of the air bag 2 deploys later than the sides.

As a result of the central part of the air bag 2 being held by the band 7 and the band 7 breaking after splitting-open of the cover 5 like this, the initial stage jump-out speed to the occupant direction becomes small, deployment in a direction parallel with the occupant is promoted and consequently good deployment behavior is obtained.

To make the band 7 break after splitting-open of the cover 5 as described above, it can be carried out by winding the band 7 so that the package volume of the folded air bag 2 becomes substantially the same as the internal volume of the receiving part 6 as shown in FIG. 7 and suitably adjusting the breaking strength of this band 7.

For this adjustment of the breaking strength of the band 7, applying the construction of the first invention described above is preferable, and by this means it is possible to make the band 7 break stably and better deployment behavior can be obtained.

In an air bag device of this embodiment, as the construction by which the band 7 is attached, the constructions of the second and third inventions described above can be applied.

In the embodiment of the second through fourth inventions described above, as the material of the band 7, any of a woven fabric, a nonwoven fabric and a film may be used. Also, as the construction of the breaking part of the band 7, it may be formed using breaking assisting means consisting of one or more type among holes, slits, cutaways and stitching. That is, for example as shown in FIG. 4, it may be formed using holes thin and long in the width direction of the band 7 in the form of a tear line, and, as shown in FIG. 5, it may be formed using slits in the form of a tear line extending in the above-mentioned width direction, and also, both ends of the band 7 may be stitched together and this stitched part made to break (not shown).

This invention is applicable to for-driver's-seat, for-passenger's-seat and various other air bag devices.

INDUSTRIAL APPLICABILITY

As described above, in an air bag device of this invention, since folding-collapsing and loosening of the air bag caused by assembly work are eliminated, the dimensions of the package volume of the air bag can be stabilized and it is possible to facilitate handling of the air bag after folding and make the receiving work thereof easy, and also in an air bag device of the first invention, by making the weaving thread direction of the band strapping the air bag biased with respect to the breaking direction of the breaking part, breaking of the band on air bag deployment is carried out more smoothly, and, in air bag devices of the second and third inventions, by utilizing other necessary components for the attachment of the above-mentioned band and thereby achieving systemization it is possible to carry out assembly work of the air bag device swiftly, and also, in an air bag device of the fourth invention, it is possible to obtain good deployment behavior wherein the jump-out speed of the central part in the initial stage of deployment is suppressed.

What is claimed is:

1. An air bag device, comprising:
   an air bag at least partially receivable in a predetermined receiving part of a vehicle;
   an inflator for inflating said air bag;
   a band breakable by a deployment pressure of the air bag, at least a part of the air bag being strapped by said band such that a folded shape thereof is retained prior to deployment of the air bag, said band being comprised of a woven fabric, and including a breaking part formed by breaking assisting structure arranged in a line corresponding to a breaking direction of the breaking part, weaving thread of the woven fabric being inclined with respect to the breaking direction of the breaking part at an inclination angle.

2. An air bag device according to claim 1, wherein the inclination angle of the weaving thread with respect to the breaking direction of the breaking part is about 40° to about 50°.

3. An air bag device according to claim 1, wherein said breaking assisting structure includes holes formed in said band which are separated by spaces therebetween substantially all of said weaving threads passing through said spaces being cut by the holes.

4. An air bag device, comprising:
   an air bag at least partially receivable in a predetermined receiving part of a vehicle;
   an inflator for inflating said air bag;
   a retainer including an attachment part for fixing the air bag to the inflator;
   a band breakable by a deployment pressure of the air bag, at least a part of said air bag being strapped by said band such that a folded shape thereof is retained prior to deployment of the air bag, said band including an insertion hole part formed therein through which the attachment part of said retainer and the inflator are inserted; and
   the air bag being strapped together with the retainer by the band, the band being interposed between the retainer and the inflator such that attachment of the air bag to the inflator by the retainer thereby achieves fixation of the band.

5. An air bag device, comprising:
   an air bag at least partially receivable in a predetermined receiving part of a vehicle;
   an inflator for inflating said air bag;
   a base plate for holding a lower face of the air bag including an engagement claw fixedly carried thereon;
   a band strapped about a part of the air bag such that a folded shape thereof is retained prior to deployment of the air bag, said band being breakable by a deployment pressure of the air bag, said band including an engagement hole receivably engageable with said engagement claw on the base plate, the band being fixed to the base plate by engagement between said engagement claw and said engagement hole.

6. An air bag device according to claim 5, further comprising:
   a retainer including an attachment part;
   said band further including an insertion hole part formed at a first end thereof through which the attachment part of the retainer and the inflator are inserted, and the engagement hole which engages with the engagement claw of the base plate being formed at a second end;
   the air bag being strapped together with the retainer by the band; and
   the first end of the band being fixed by attachment of the air bag to the inflator by the retainer and the second end being fixed by engagement with the engagement claw of the base plate.

7. An air bag device, comprising:

an air bag at least partially receivable in a predetermined receiving part of a vehicle to which a cover covering an upper face of the air bag is mounted, an inflator for inflating said air bag; and a band breakable by a deployment pressure of the air bag, at least a part of the air bag being strapped by said band such that a folded shape thereof is retained prior to deployment of the air bag, said band being disposed so as to press down a pair of side parts including a central portion of the air bag while folded prior to deployment thereof, and upon deployment of the air bag, the band is broken after the cover is split open by said deployment pressure, the band being comprised of a woven fabric, and including a breaking part formed by breaking assisting structure arranged in a line corresponding to a breaking direction of the breaking part, weaving thread of the woven fabric being inclined with respect to the breaking direction of the breaking part at an inclination angle.

8. An air bag device according to claim 4 or 5, wherein the band is comprised of at least one of a woven fabric, a nonwoven fabric and a film.

9. An air bag device according to claim 4 or 5 wherein the breaking part of the band is formed by breaking assisting structure including of at least one of holes, slits, cutaways and stitching.

\* \* \* \* \*